Dec. 26, 1961  G. A. SEEWER  3,014,438
DOUGH SHEETER
Filed May 12, 1959  2 Sheets-Sheet 1
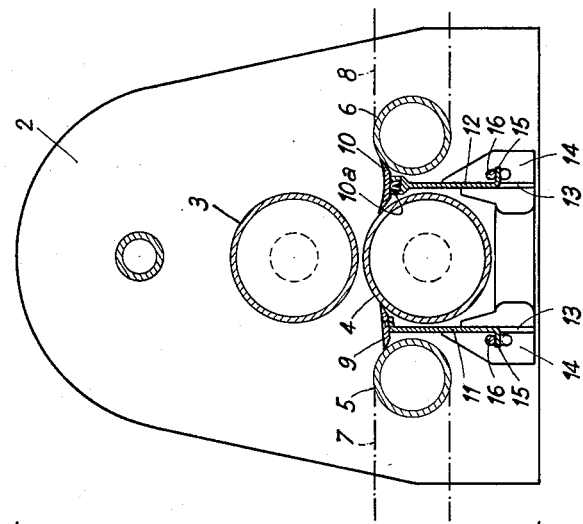
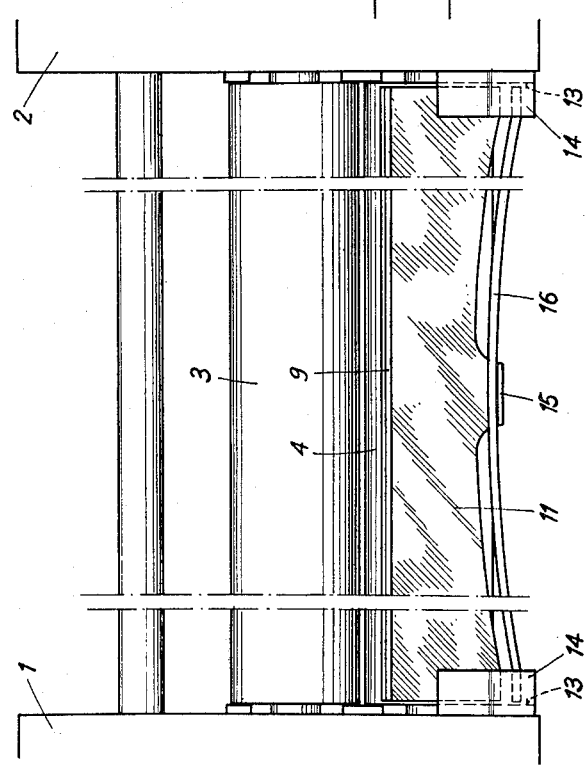
Inventor:
Gustave A. Seewer
by: Michael S. Striker
Attorney Dec. 26, 1961    G. A. SEEWER    3,014,438
DOUGH SHEETER Filed May 12, 1959    2 Sheets-Sheet 2

3,014,438
DOUGH SHEETER
Gustave A. Seewer, Heimiswilstrasse 42, Burgdorf, Bern, Switzerland
Filed May 12, 1959, Ser. No. 812,711
Claims priority, application Switzerland May 14, 1958
6 Claims. (Cl. 107—12)

The present invention relates to apparatus for handling viscous substances. More particularly, the present invention relates to apparatus for handling viscous substances including a roller adapted to convey a viscous substance and scraping means.

The present invention relates to dough sheeters of the kind comprising a pair of superposed sheeting rolls adapted to be rotated in opposite directions and adapted to have their direction of rotation simultaneously reversed, and two conveyor devices located on opposite sides of the lower sheeting roll. The conveyor devices act alternatively as dough feeding conveyor device and as dough removing conveyor device and each includes an endless conveying belt and a drive roll therefor located in the vicinity of the said lower sheeting roll. There is a gap between each of the drive rolls and the lower sheeting roll and according to common practice the dough sheeter also comprises two so-called "lower strip-off blades" constituting bridges located in either one of the gaps. During the use of the sheeter, one of these blades serves the purpose of leading the parcel of dough to be sheeted from the feeding conveyor device to the bite between the sheeting rolls and the other blade at the same time serves the purpose of separating the dough from the lower sheeting roll and of leading it to the dough removing conveyor device. The lower sheeting roll is kept clean as a result of the separation action.

In order that the lower strip-off blades can be fully effective several conditions must be observed. These conditions include that (a) They should bear on the lower sheeting roll with a contact pressure substantially uniform over their whole length;

(b) They should be easily removable;

(c) They should extend with one of their longitudinal edges very near along that portion of the adjacent conveyor belt that runs over the corresponding drive roll, without touching that portion of belt;

(d) They should not reduce the effective length of the bite between the sheeting roll.

A primary object of the present invention is to provide a structure for the dough sheeter such that these conditions are fulfilled.

To this end, the invention provides two blade supporting webs or members guided for vertical movement in grooves of pairs of fixed guiding blocks and provided each at the middle portion of its lower edge with a lug on which a downwardly directed force is exerted by a corresponding spring bar the ends of which are held in the guiding blocks. In order that the present invention may be readily carried into effect it will now be more fully described with reference to the accompanying drawings, in which:

FIG. 1 is a partial end view of an embodiment of a dough sheeter utilizing the scraper of the present invention;

FIG. 2 is a longitudinal section of that portion of the embodiment of FIG. 1 which comprises the sheeting rolls, the adjacent portions of the conveyor devices and the strip-off blades;

Figure 4:
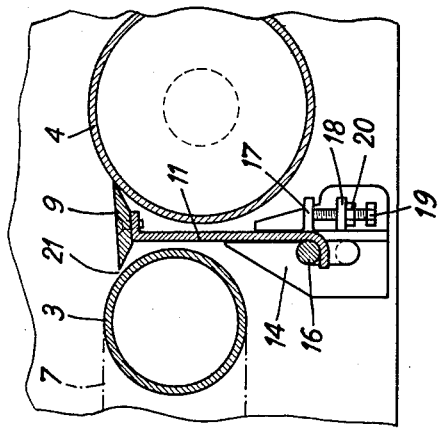
FIG. 4 is partial longitudinal section similar to FIG. 2 of the modification of FIG. 3.

Referring now to FIGS. 1 and 2, the reference numerals 1 and 2 designate two casings rigidly connected to each other in which the superposed sheeting rolls 3 and 4 and the drive rolls 5 and 6 of the conveyor belts 7 and 8 are rotatably mounted. The width of the bite between the rolls 3 and 4 can be regulated by actuating a mechanism (not shown) changing the position of the upper roll 3. The means for driving the rolls 3, 4, 5, 6 are conveniently arranged in the casings 1 and 2; the arrangement of these means is such that the rolls 3 and 4 rotate in opposite directions and that their directions of rotation and also the direction of rotation of the drive rolls 5 and 6 can be simultaneously reversed, whereby the conveyors including the belts 7 and 8, respectively, alternatively act, one as dough feeding conveyor and the other as dough removing conveyor, or vice versa, depending on the directions of rotation of the sheeting rolls 3 and 4. The arrangement of these means is well known in the art and may be such as described for example in United States Patent No. 2,275,714 to Anetsberger et al., or such as described in the United States Patent No. 2,792,792 to Seewer.

The scraper includes a blade support having a first portion and a second portion spaced from the first portion; a blade affixed to the blade support at the front portion thereof; a stationary guide in the region of the second portion of the blade support. The blade support is mounted at the second portion thereof in the stationary guide slidably between an operative position in which the blade is in contact with the surface of the roller and an inoperative position in which the blade is out of contact with said surface. A spring or resilient means extends between the second portion of the blade and the stationary guide and resiliently urges the blade from inoperative position to operative position so as to resiliently engage the surface of the roller with substantially uniform pressure.

The reference numerals 9 and 10 designate the blades or "lower strip-off blades." For the purpose of illustrating one possibility, the blade 9 is shown to be riveted or screwed to the bent-over upper edge or first portion of an upstanding stiff blade supporting means or web 11 made of sheet metal. In order to illustrate another possibility, the blade 10 is shown to be connected to the upper edge or first portion of a similar blade supporting means or web 12 by means of a dovetail joint 10a.

The blade supporting means or webs 11, 12 are lodged with their lateral ends in vertical grooves 13 of stationary guide means or guiding blocks 14 fixed to either one of the casings 1 and 2; they can be removed by upward movement. Each of the blade supporting webs 11, 12 has a sidewardly bent lug 15 at the middle of its lower edge or second portion. A spring bar 16 the ends of which are held in bores of the corresponding stationary guide means or guiding blocks 14 exerts a downwardly directed pressure on the lug 15 whereby the corresponding strip-off blade 9 or 10 is pressed on the lower sheeting roll 4 with one of its longitudinal edges.

If the operator wants to remove the strip-off blades he must merely tilt the spring bars or resilient means 16 away from the blade supporting webs to disengage these bars from the lugs 15. The blades 9, 10, together with their blade supporting webs 11 and 12, respectively, may then be removed by an upward displacement by which the blade supporting webs are disengaged from the grooves 13. It is obvious that the upper sheeting roll 3 should be near to the upper limit of its range of regulation when such a removal (or insertion) is effected.

Figure 3:
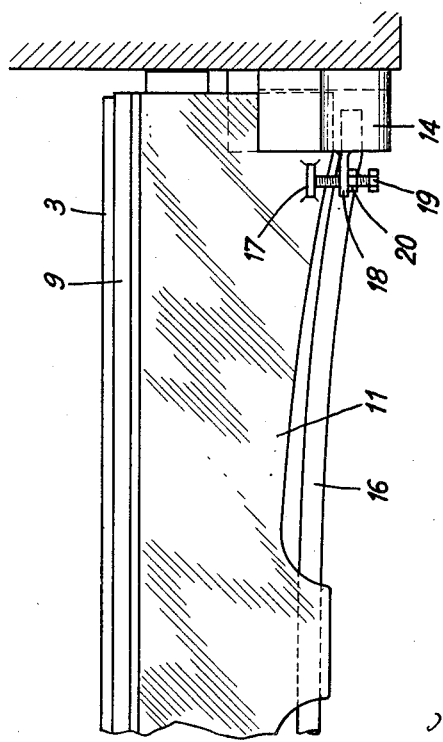
FIG. 3 is a partial end view similar to FIG. 1 of a dough sheeter utilizing a modification of the scraper of FIGS. 1 and 2.

The modification shown in FIGS. 3 and 4 is similar to the embodiment just described.

A lug 17 is welded to each blade end of each supporting web 11 and 12 and a lug 18 is welded to each stationary guide or guiding block 14, so that the lugs 17, 18 are superposed pairwise as shown for one pair. Each lug 18 has a threaded hole in which a stop screw 19 may be adjusted in vertical direction and then be locked by tightening a locking nut 20.

The strip-off blade 9, which in this modification is preferably made of somewhat resilient matter, is pressed on the periphery of the lower sheeting roll 4 due to the pressure exerted on the lug 15 by the spring bar 16, substantially in the same manner as in the embodiment of FIGS. 1 and 2. A very narrow gap 21 is left between the portion of conveyor belt 7 running over the drive roll 3 and the adjacent edge of the strip-off blade 9. The principal purpose of the adjusting means comprising the stop screws 19 is to permit the adjustment of the width of the gap 21. The contact pressure between the blade 9 and the lower sheeting roll 4 depends on the amount of transversal flexion of the elements 9, 11 (or 10, 12) and on the force exerted by the spring bar 16. It is clear that the force exerted by the spring bar 16 must be sufficiently strong to warrant a contact of the lugs 17 with the stop screws 19.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What I claim is:

1. In an apparatus for handling viscous substances including a roller adapted to convey a viscous substance, scraping means comprising, in combination, blade supporting means having a first portion and a second portion spaced from said first portion; blade means affixed to said blade supporting means at said first portion thereof; stationary guide means in the region of said second portion of said blade supporting means; means mounting said blade supporting means at said second portion thereof in said guide means slidably between an operative position in which said blade means is in contact with the surface of said roller and an inoperative position in which said blade means is out of contact with said surface; and resilient means extending between said second portion of said blade supporting means and said stationary guide means resiliently urging said blade means from inoperative position to operative position so as to resiliently engage the surface of said roller with substantially uniform pressure.

2. In an apparatus for handling viscous substances including a roller adapted to convey a viscous substance, scraping means comprising, in combination, blade supporting means having a first portion and a second portion spaced from said first portion; blade means affixed to said blade supporting means at said first portion thereof; stationary guide means in the region of said second portion of said blade supporting means; means mounting said blade supporting means at said second portion thereof in said guide means slidably between an operative position in which said blade means is in contact with the surface of said roller and an inoperative position in which said blade means is out of contact with said surface; and resilient means disengageably engaged between said second portion of said blade supporting means and said stationary guide means resiliently urging said blade means from inoperative to operative position so as to resiliently engage the surface of said roller with substantially uniform pressure, said scraping means being removable from said apparatus by disengagement of said resilient means.

3. In an apparatus for handling viscous substances including a roller adapted to convey a viscous substance, scraping means comprising, in combination, blade supporting means having a first portion and a second portion spaced from said first portion, said blade supporting means having a lug projecting therefrom at said second portion thereof; blade means affixed to said blade supporting means at said first portion thereof; stationary guide means in the region of said second portion of said blade supporting means; means mounting said blade supporting means at said second portion thereof in said guide means slidably between an operative position in which said blade means is in contact with the surface of said roller and an inoperative position in which said blade means is out of contact with said surface; and resilient means disengageably engaged between the lug of said blade supporting means and said stationary guide means resiliently urging said blade means from inoperative to operative position so as to resiliently engage the surface of said roller with substantially uniform pressure, said scraping means being removable from said apparatus by disengagement of said resilient means from said lug.

4. In an apparatus for handling viscous substances including a roller adapted to convey a viscous substance, scraping means comprising, in combination, blade supporting means having a first portion and a second portion spaced from said first portion, said blade supporting means having a lug projecting therefrom at said second portion thereof; blade means affixed to said blade supporting means at said first portion thereof; stationary guide means in the region of said second portion of said blade supporting means, said guide means having a groove formed therein; means mounting said blade supporting means at said second portion thereof in the groove of said guide means slidably between an operative position in which said blade means is in contact with the surface of said roller and an inoperative position in which said blade means is out of contact with said surface; and a resilient bar disengageably engaged between the lug of said blade supporting means and said stationary guide means resiliently urging said blade means from inoperative to operative position so as to resiliently engage the surface of said roller with substantially uniform pressure, said scraping means being removable from said apparatus by disengagement of said resilient bar from said lug.

5. In apparatus for handling viscous substances including a roller adapted to conveyor a viscous substance, scraping means comprising, in combination, blade supporting means having a first portion and a second portion spaced from said first portion; blade means affixed to said blade supporting means at said first portion thereof; stationary guide means in the region of said second portion of said blade supporting means; means mounting said blade supporting means at said second portion thereof in said guide means slidably between an operative position in which said blade means is in contact with the surface of said roller and an inoperative position in which said blade means is out of contact with said surface; resilient means extending between said second portion of said blade supporting means and said stationary guide means resiliently urging said blade means from inoperative to operative position so as to resiliently engage the surface of said roller with substantially uniform pressure; and adjusting means mounted on said guide means for adjusting the magnitude of said pressure, said adjusting means comprising first lug means affixed to said guide means, second lug means affixed to said blade supporting means and means for adjusting the distance between said first and second lug means and for locking the said first and second lug means in position.

6. In apparatus for handling viscous substances including a roller adapted to convey a viscous substance, scraping means comprising, in combination, blade supporting means having a first portion and a second portion spaced from said first portion, said blade supporting means having a lug projecting therefrom at said second portion thereof; blade means affixed to said blade supporting means at said first portion thereof; stationary guide means in the region of said second portion of said blade supporting means, said guide means having a groove formed therein; means mounting said blade supporting means at said second portion thereof in the groove of said guide means slidably between an operative position in which said blade means is in contact with the surface of said roller and an inoperative position in which said blade means is out of contact with said surface; a resilient bar disengageably engaged between the lug of said blade supporting means and said stationary guide means resiliently urging said blade means from inoperative to operative position so as to resiliently engage the surface of said roller with substantially uniform pressure, said scraping means being removable from said apparatus by disengagement of said resilient bar from said lug; and adjusting means mounted on said guide means for adjusting the magnitude of said pressure, said adjusting means comprising first lug means affixed to said guide means, second lug means affixed to said blade supporting means and means for adjusting the distance between said first and second lug means and for locking the said first and second lug means in position.

References Cited in the file of this patent

UNITED STATES PATENTS

| | | |
|---|---|---|
| 661,999 | Kessler | Nov. 20, 1900 |
| 1,520,602 | Schmid | Dec. 23, 1924 |
| 1,831,531 | Harber | Nov. 10, 1931 |
| 2,125,859 | Liebelt | Aug. 2, 1938 |
| 2,275,714 | Anetsberger et al. | Mar. 10, 1942 |